United States Patent [19]

Graf

[11] Patent Number: 5,202,172

[45] Date of Patent: Apr. 13, 1993

[54] MOLDING AND RETAINER ASSEMBLY

[75] Inventor: Edward J. Graf, Oxford, Mich.

[73] Assignee: General Motors Corporation, Detroit, Mich.

[21] Appl. No.: 702,861

[22] Filed: May 20, 1991

[51] Int. Cl.⁵ ............................................. B32B 3/06
[52] U.S. Cl. ................................... 428/100; 428/99; 428/31; 24/292; 24/297; 293/128
[58] Field of Search .......... 428/99, 100, 31; 24/290, 291, 292, 297; 293/128

[56] References Cited

U.S. PATENT DOCUMENTS

| | | | |
|---|---|---|---|
| 2,611,136 | 9/1952 | Wiley | 24/73 |
| 2,670,512 | 3/1954 | Flora | 24/73 |
| 2,681,487 | 6/1954 | Poupitch | 24/73 |
| 2,885,754 | 5/1959 | Munse | 24/73 |
| 3,092,884 | 6/1963 | Elms | 24/73 |
| 3,204,308 | 9/1965 | Jaworski | 24/73 |
| 3,634,991 | 1/1972 | Barton et al. | 52/718 |
| 4,783,110 | 11/1988 | Beukema et al. | 296/37.7 |

Primary Examiner—Alexander S. Thomas
Attorney, Agent, or Firm—William A. Schuetz

[57] ABSTRACT

The disclosure relates to a plastic reveal molding and retainer assembly for attachment to an apertured side body or door panel of an automotive vehicle. The retainer has a planar bottom portion which can be readily attached to the panel, a pair of deflectable end portions which are integrally connected to the bottom portion via living hinges and a deflectable barbed fastener integral with the bottom portion and projecting transversely therefrom. The molding is elongated, has an arcuate shape, as viewed in cross section, and has pairs of spaced chordally extending flanges adjacent its opposite ends and a pair of spaced apertured flanges at its center. The molding is attached to the retainer by moving the same thereover so that the end portion of the retainers are captured between the pairs of chordally extending flanges and so that the central flanges are snap fitted over the barbed fastener with a force fit to hold the molding in place. The end portions of the retainer each have a ferrule which is received through an aperture in the panel when the molding is assembled thereto. Threaded fasteners are then screwed into the ferrule from the back surface of the panel to pull the end portions of the retainer and the molding ends into tight engagement with the front surface of the panel.

4 Claims, 1 Drawing Sheet

MOLDING AND RETAINER ASSEMBLY

The present invention relates to a molding and retainer assembly and, more particularly, to a reveal molding and retainer assembly which can be readily attached to an apertured side body or door panel of an automotive vehicle and which holds the molding tight against the panel.

The present invention provides a novel reveal molding and retainer assembly for attachment to an apertured side body or door panel of an automotive vehicle. The retainer is made from plastic and has a planar bottom portion which can be readily attached to the panel, a pair of deflectable end portions which are integrally connected to the bottom portion via living hinges and a deflectable barbed fastener integral with the bottom portion and projecting transversely therefrom. The molding is preferably made from plastic, is elongated and has an arcuate shape, as viewed in cross section. The molding has pairs of spaced chordally extending flanges adjacent its opposite ends and a pair of spaced apertured flanges at its center. The molding is attached to the retainer by moving the same thereover so that the end portion of the retainers are captured between the pairs of chordally extending flanges and so that the central flanges are snap fitted over the barbed fastener with a force fit to hold the molding in place. The end portions of the retainer each have a ferrule which is received through an aperture in the panel when the molding is assembled thereto. Threaded fasteners are then screwed into the ferrule from the back surface of the panel to pull the end portions of the retainer and the molding ends into tight engagement with the front surface of the panel.

Advantages of the novel reveal molding and retainer assembly are that it can be easily and readily assembled to an apertured panel as a result of the molding being held in place by the deflectable barbed fastener and then the molding can be drawn into tight engagement with the panel by the threaded fasteners. If replacement of the molding is required, it can be readily disassembled from the retainer by first removing the threaded fasteners and then compressing the barbed fastener via a tool insertable through aligned slots in the panel and adjacent the barbed fastener.

The present invention further resides in various novel constructions and arrangement of parts, and further novel features, characteristics and advantages of the present invention will be apparent to those skilled in the art to which it relates and from the following detailed description of the illustrated, preferred embodiment thereof made with reference to the accompanying drawings forming a part of this specification and in which similar reference numerals are employed to designate corresponding parts throughout the several views, and in which:

Figure 1:
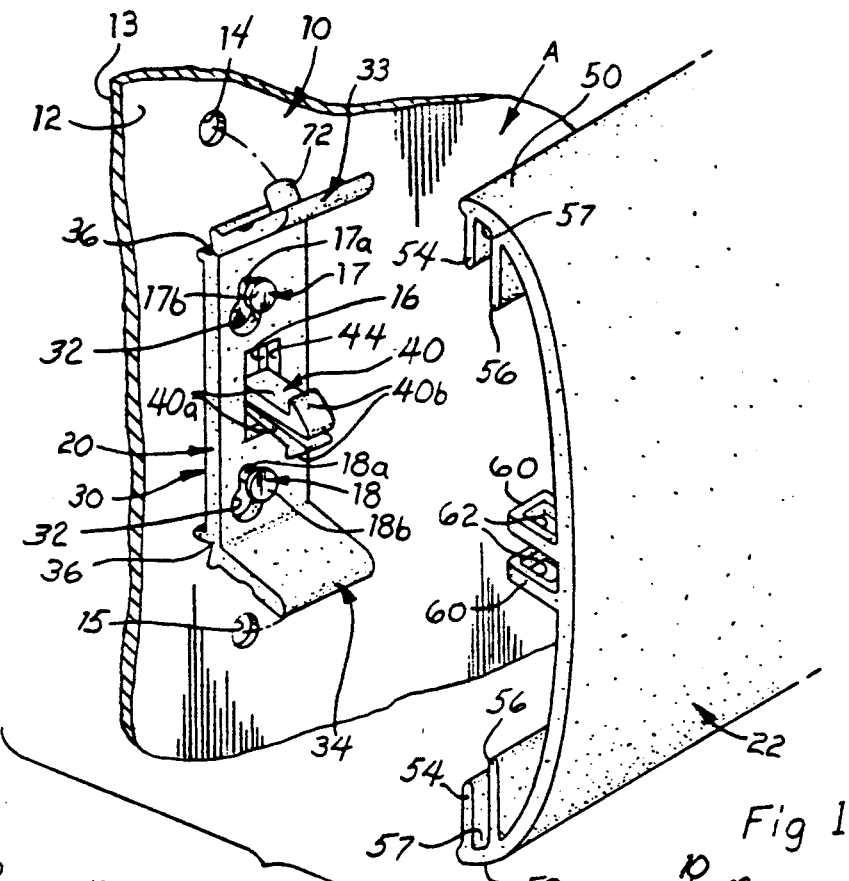
FIG. 1 is a fragmentary perspective view of an apertured panel and showing the retainer assembled thereto and the molding spaced from the retainer.

The present invention provides a molding and retainer or retainer clip assembly A for attachment to an apertured panel, such as a side body or door panel 10 of automotive vehicle (not shown). The apertured panel 10 comprises a thin sheet metal member having an exterior surface 12 and an interior surface 13. The panel 10 also has a pair of vertically spaced openings 14, 15 and has a slot 16 located midway between the openings 14, 15. The panel 10 also carries vertically spaced headed studs or rivets 17, 18 which are welded or otherwise suitably secured to the exterior surface 12 of the panel 10. The studs 17, 18 each comprise a shank portion 17a, 18a secured to the exterior surface 12 of the panel 10 and a head portion 17b, 18b of a greater diameter than the shank portion 17a, 18a.

The molding and retainer assembly A comprises a one piece plastic retainer 20 and a one piece molding 22, preferably also made of a suitable plastic material. The retainer 20 has a generally planar rectangularly shaped bottom portion 30 provided with a pair of vertically spaced key hole slots 32. The retainer 30 also includes upper and lower generally planar square shaped end portions 33, 34, respectively, which are integrally connected with the bottom portion 30 at its upper and lower ends by living hinges 36. The retainer 20 in its as-molded condition, has its end portions 33, 34 extending transversely of the bottom portion 30 so as to define an obtuse included angle a therebetween. The end portions 33, 34 are deflectable relative to the bottom portion 30 via the living hinges 36.

Integrally formed with the bottom portion 30 intermediate its upper and lower ends, as viewed in the drawings, is a barbed fastener 40. The barbed fastener 40 comprises upper and lower legs 40a which diverge away from each other and terminate in oppositely directed barbs 40b at their free ends. The diverging legs 40a are spaced from each other but are formed integral with the body portion 30 so that the legs 40a can be flexed toward and away from each other. The bottom portion 30 of the retainer is also provided with a through slot 44 adjacent the upper and lower legs 40a of the barbed fastener 40 which is in alignment with the slot 16 in the apertured panel 10, and for a reason to be hereinafter more fully described.

The molding 22 is elongated, has an arcuately shaped cross section, as viewed in the drawings, and terminates in upper and lower ends 50, 52 which are rounded. The molding also has adjacent its upper and lower ends 50, 52 a pair of spaced flanges 54, 56 which define a channel 57 therebetween. The flanges 54, 56 extend toward each other or chordally of the molding 22 on its back side facing the retainer 20. The lateral or transverse distance $T_1$ between the ends of the flanges 54 is greater than the transverse or lateral distance $T_2$ between the free ends of the end portions 33, 34 of the retainer 20 while the transversely or lateral distance $T_3$ between the ends of the flanges 56 is less than the distance $T_2$ between the free ends of the end portions 33, 34 of the retainer 20. The molding 22 on its back side also includes a pair of centrally located parallel spaced flanges 60 which have aligned through slots 62. The lateral or transverse distances between the flanges 60 is less than the transverse distance between the outermost ends of the barbs 40b on the retainer 20.

It should be noted at this point that while the drawings only illustrate one retainer for use with the elongated molding 22, it should be apparent that a plurality of retainers 20 would be employed at spaced longitudinal locations along the body panel or side door 10 of the vehicle depending on the length of the elongated molding 22.

Figure 2:
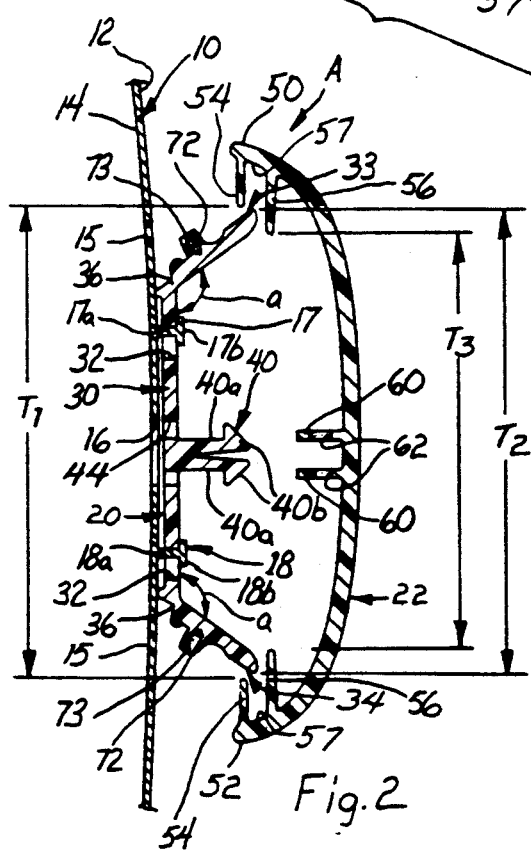
FIG. 2 is a vertical cross sectional view of the molding and retainer assembly shown in FIG. 1.
Figure 3:
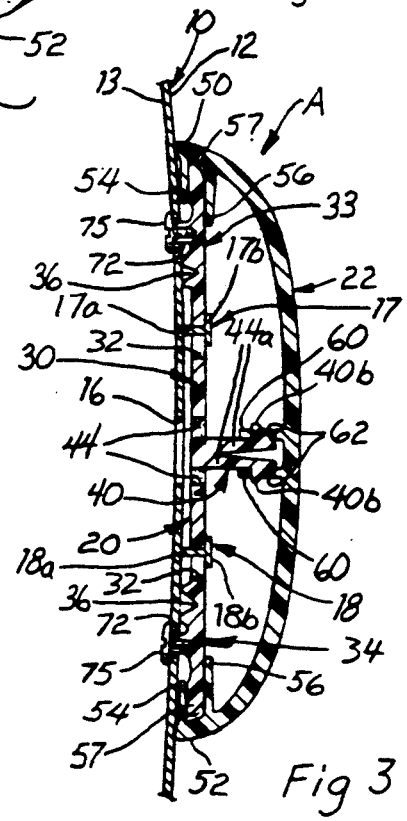
FIG. 3 is a cross sectional view like that shown in FIG. 2 but showing the molding and retainer fully connected to the apertured panel.

The manner in which the molding assembly A is attached to the apertured panel 10 will now be described in detail. The retainer or retainers 20 are mounted onto the panel 10 by positioning the enlarged portion of the key hole slots 32 over the heads 17b, 18b of the studs 17, 18. The retainer 20 then is moved downwardly so that the shank portions 17a, 18a is received within the narrow portion of the key hole slots 32 so that the heads 17b, 18b will overlie the retainer 20, as shown in FIGS. 1-3.

The molding 22 then is horizontally moved toward the retainer or retainers 20 and positioned thereover. During this movement, the flanges 56 will engage the end portions 33, 34 of the retainer 20 to capture the end portions in the channels 57 between the flanges 54, 56 and cause the end portions 33, 34 to deflect about the living hinges 36 toward the panel 10. At the same time, the central flanges 60 will engage the barbed fastener 40 to cause the legs 40a to be deflected toward each other until the slots 62 are aligned with the barbs 40b. When this occurs, the inherent resilience of the barbed fastener 40 will cause the legs 40a to move away from each other and with the barbs 40b being received within the slots 62 to retain the molding onto the retainer 20. In this position also, the end portions 33, 34 of the retainer 10 are also fully received within the channels 57.

In order to ensure a tight engagement between the ends 52 and 50 of the molding 22 against the outer surface 12 of the panel 10, and to prevent the retainer 20 from being removed from the apertured panel by sliding the molding and retainer upward, a second fastening means 70 is provided. The fastening means 70 comprises ferrules 72 having threaded openings 73 therein which are integrally formed on the back side of the end portion 33, 34 of the retainer 20. The ferrules 72 are located such that they will be received or moved through the apertures 14, 15 in the panel 10 when the molding 22 is assembled onto the fastener 40. Thereafter, threaded fasteners, preferably screws, 75 are employed to pull the end portions 33, 34 and the molding ends 50, 52 into tight engagement with the exterior surface 12 of the panel 10. The fasteners 75 are secured from the inner side surface 13 of the panel 10. The fastener could also be self tapping screws which merely self tap a thread in openings formed in the ferrules 72.

From the foregoing, it should be apparent that the retainer 20 can be readily assembled onto the apertured panel 10 and that the molding 22 can be readily assembled onto the barbed fastener 40 so as to be held in place without requiring any undue force or assembly procedure. In addition, it can be seen that the ends of the molding 50, 52 are brought into tight engagement with the apertured panel via the use of the threaded fasteners 75 threading into ferrules 72 integral with the end portions 33, 34 of the retainer. Once the fasteners 75 are secured in place, the retainer 20 cannot be moved vertically upwardly so as to cause the same to become dislodged from the weld studs 17, 18 on the panel 10.

It should also be apparent that should the outer reveal molding 22 become damaged so that it has to be replaced, that such replacement can also readily be made. All that need be done is that the fasteners 75 be unscrewed from the ferrules 72 of the end portions 33, 34 of the retainer 20 and thereafter a tool insertable through the slot 16 in the panel and the slot 44 adjacent the deflectable legs can be employed to cause the legs 40a to be deflected towards each other so as to enable the central flanges 60 to be dislodged from the barbed fastener 40.

Although the illustrated embodiment thereof has been described in great detail, it should be apparent that certain modifications, changes and adaptations may be made in the illustrated embodiment, and that it is intended to cover all such modifications, changes and adaptations which come within the spirit of the present invention.

The embodiments of the invention in which an exclusive property or privilege is claimed are defined as follows:

1. In combination, a panel having spaced apertures and front and back surfaces and a reveal molding and retainer assembly for attachment to said panel,
   said retainer having a generally planar bottom and first and second end portions integrally connected to the bottom at its opposite ends via living hinges,
   means attaching said bottom of said retainer to said apertured panel and with said bottom being against the front surface of said panel,
   said first and second end portions of said retainer, when in their normal free state position, extending transversely of said front surface of said panel, said end portions having their free ends laterally spaced from each other a given distance,
   said molding being elongated, transversely arcuate in shape and terminating in ends along its elongated sides which are engageable with said apertured panel,
   said molding adjacent each end having first and second spaced flanges extending chordally inwardly toward each other and with said first flanges being located closest to said ends,
   said first flanges being laterally spaced apart a distance greater than said given distance between the free ends of said end portions of said retainer, said second flanges being laterally spaced apart a distance less than said given distance,
   said second flanges engaging said end portions of said retainer and causing said end portions of said retainer to deflect about said living hinges when said molding is moved toward said panel front surface and over said retainer until the ends of the molding engage and are positioned against said panel, said end portions of said retainer being captured between said first and second flanges when the molding is so positioned against the front surface of the panel,
   first deflectable fastener means retaining said molding to said retainer when the molding is moved over the retainer and positioned against the panel, and
   second fastener means including means on said end portions of said retainer which are received within said apertures of said panel when said end portions are positioned against said front surface of said panel for retaining said end portions of said retainer and for tightly holding said molding in place against the panel.

2. In combination, a panel having spaced apertures and front and back surfaces and a reveal molding and retainer assembly for attachment to said panel,
   said retainer having a generally planar bottom and first and second end portions integrally connected to the bottom portion at its opposite ends via living hinges, a deflectable barbed fastener formed integral with said bottom and extending transversely thereof, means attaching said bottom of said retainer to said apertured panel and with said bottom being against the front surface of said panel, said first and second end portions of said retainer, when in their normal free state position, extending transversely of said front surface of said panel, said end portions having their free ends laterally spaced from each other a given distance, said molding being elongated, transversely arcuate in shape and terminating in ends along its elongated sides which are engageable with said apertured panel, said molding adjacent each end having first and second spaced flanges extending chordally inwardly toward each other and with said first flanges being located closest to said ends, said first flanges being laterally spaced apart a distance greater than said given distance between the free ends of said end portions of said retainer, said second flanges being laterally spaced apart a distance less than said given distance, said molding having a pair of spaced centrally located flanges extending transversely thereof and provided with through slots, said second flanges engaging said end portions of said retainer and causing said end portion of said retainer to deflect about said living hinges when said molding is moved toward said panel front surface and over said retainer until the ends of the molding engage and are positioned against said panel, said end portions of said retainer being captured between said first and second flanges when the molding is so positioned against the front surface of the panel, said spaced centrally located flanges causing said barbed fastener to be deflected until its barbs are snap fittingly received within said slots of said central flanges when the molding is moved over the retainer whereupon said deflectable barbed fastener retains said molding in place on the retainer, second fastener means including ferrules formed integral with said end portions of said retainer which are received within said apertures of said panel when said end portions are moved and positioned against said front surface of said panel and threaded members threadably engageable with said ferrules from the back surfaces of said panel for drawing said end portions of said retainer and said molding tightly in place against the front surface of said panel.

3. In combination, as defined in claim 2, and wherein said deflectable barbed fastener comprises a pair of spaced cantilevered legs having barbs at their distal ends.

4. In combination, as defined in claim 3, and wherein said panel and said bottom portion of said retainer have aligned slots to permit access for a tool from the back surface of the panel to enable said cantilevered legs of said deflectable fastener to be pressed toward each other to release said central flanges of said molding to enable said molding to be disassembled from said deflectable barbed fastener.

* * * * *